(12) United States Patent
Fujii

(10) Patent No.: US 10,558,304 B2
(45) Date of Patent: Feb. 11, 2020

(54) TOUCH SENSOR AND TERMINAL DEVICE

(71) Applicant: FUJITSU CLIENT COMPUTING LIMITED, Kawasaki-shi, Kanagawa (JP)

(72) Inventor: Tomonori Fujii, Kawasaki (JP)

(73) Assignee: FUJITSU CLIENT COMPUTING LIMITED (JP)

( * ) Notice: Subject to any disclaimer, the term of this patent is extended or adjusted under 35 U.S.C. 154(b) by 173 days.

(21) Appl. No.: 15/473,954

(22) Filed: Mar. 30, 2017

(65) Prior Publication Data

US 2017/0300145 A1    Oct. 19, 2017

(30) Foreign Application Priority Data

Apr. 18, 2016 (JP) .................. 2016-083104

(51) Int. Cl.
*G06F 3/044*     (2006.01)
*G06F 3/0346*    (2013.01)
*G06F 1/16*      (2006.01)

(52) U.S. Cl.
CPC ............ *G06F 3/044* (2013.01); *G06F 1/1626* (2013.01); *G06F 1/1684* (2013.01);
(Continued)

(58) Field of Classification Search
CPC ...... G06F 3/044; G06F 1/1626; G06F 1/1694; G06F 3/0346
See application file for complete search history.

(56) References Cited

U.S. PATENT DOCUMENTS

| | | | |
|---|---|---|---|
| 7,884,807 B2 * | 2/2011 | Hovden | G06F 1/1626 178/18.01 |
| 2006/0238517 A1 * | 10/2006 | King | G06F 3/03547 345/173 |

(Continued)

FOREIGN PATENT DOCUMENTS

| | | |
|---|---|---|
| JP | 11-175212 | 7/1999 |
| JP | 2013-196582 | 9/2013 |

(Continued)

OTHER PUBLICATIONS

Espacenet Bibliographic data, Japanese Publication No. 11-175212 published Jul. 2, 1999.

(Continued)

*Primary Examiner* — Benyam Ketema
(74) *Attorney, Agent, or Firm* — Harness, Dickey & Pierce, P.L.C

(57) ABSTRACT

A touch sensor includes a sensor and a processor. The sensor detects touch operations on first, second, and third regions of a sensor region disposed along a longitudinal direction of an outer edge portion of a terminal device. The second and third regions are on opposite sides of the first region. The processor identifies the orientation of the terminal device as a first orientation where the sensor region is located at the top or bottom of the terminal device or a second orientation where the sensor region is located at the right or left of the terminal device, and makes a different determination as to whether the first region is depressed based on whether the identified orientation is the first or second orientation, in response to detection of the touch operation on at least one of the second and third regions together with the touch operation on the first region.

10 Claims, 10 Drawing Sheets

(52) U.S. Cl.
CPC .......... *G06F 1/1694* (2013.01); *G06F 3/0346* (2013.01); *G06F 2203/0339* (2013.01)

(56) References Cited

U.S. PATENT DOCUMENTS

| | | | | |
|---|---|---|---|---|
| 2007/0152974 | A1* | 7/2007 | Kim | G06F 3/016 345/168 |
| 2009/0179854 | A1* | 7/2009 | Weber | G06F 1/1626 345/156 |
| 2010/0110031 | A1* | 5/2010 | Miyazawa | G06F 3/0488 345/173 |
| 2011/0167391 | A1* | 7/2011 | Momeyer | G06F 1/1684 715/863 |
| 2013/0201113 | A1* | 8/2013 | Hinckley | G06F 3/0487 345/173 |
| 2014/0006985 | A1* | 1/2014 | Matsushima | G06F 3/04883 715/765 |
| 2014/0368441 | A1* | 12/2014 | Touloumtzis | G06F 3/017 345/173 |
| 2015/0061701 | A1* | 3/2015 | Fujii | G06F 3/044 324/679 |
| 2015/0346850 | A1* | 12/2015 | Vandermeijden | G06F 3/041 345/173 |

FOREIGN PATENT DOCUMENTS

| | | |
|---|---|---|
| JP | 2014-010494 A | 1/2014 |
| JP | 2015-049541 A | 3/2015 |
| WO | WO 2008/126265 | 10/2008 |

OTHER PUBLICATIONS

Espacenet Bibliographic data, Japanese Publication No. 2013-196582 published Sep. 30, 2013.
Japanese Office Action for Patent Application No. JP 2016-083104 dated Oct. 29, 2019 (4 pages).

* cited by examiner

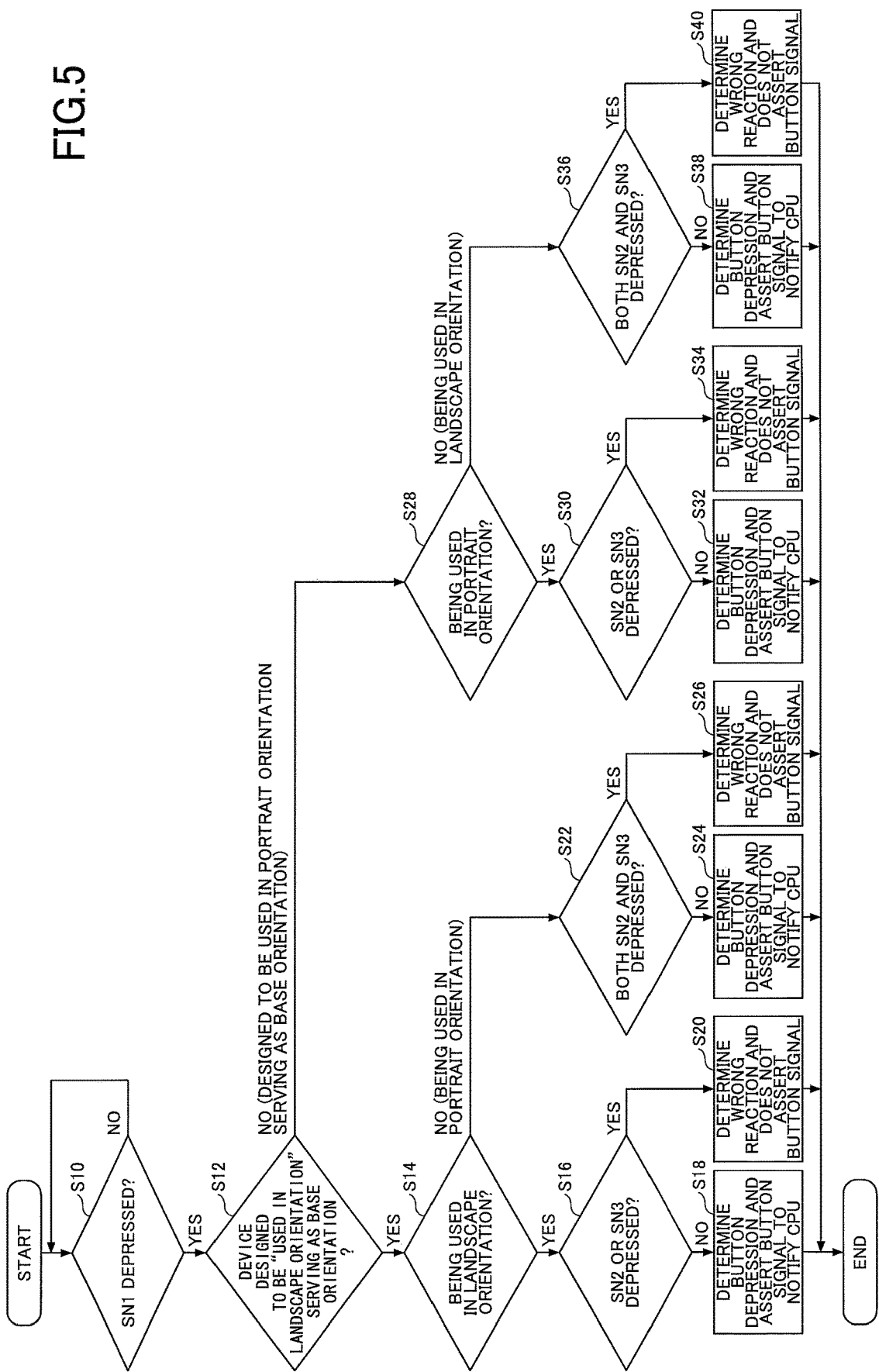

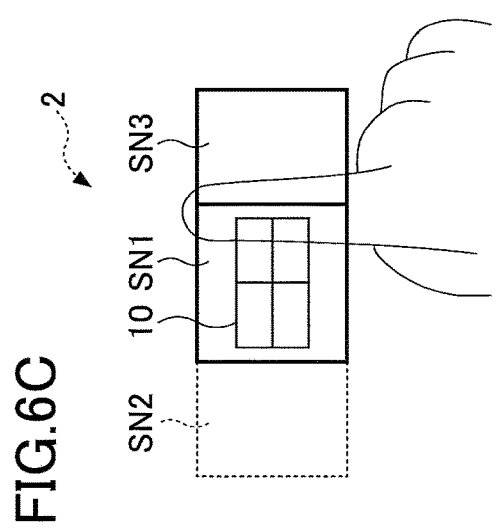
FIG.6A
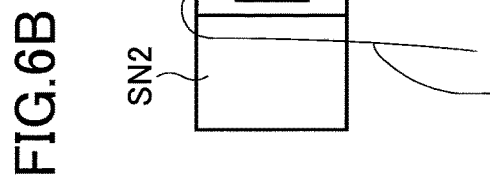
FIG.6B
FIG.6C
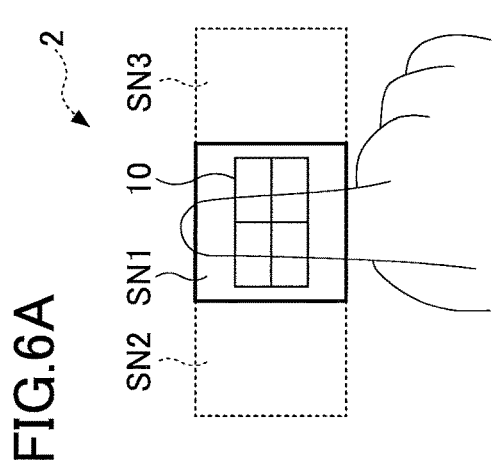
FIG.6D
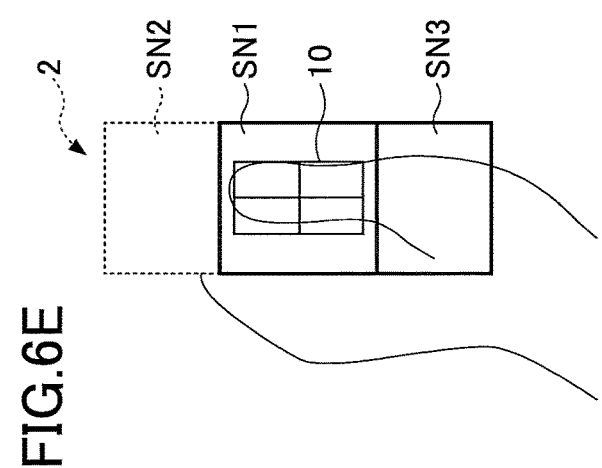
FIG.6E

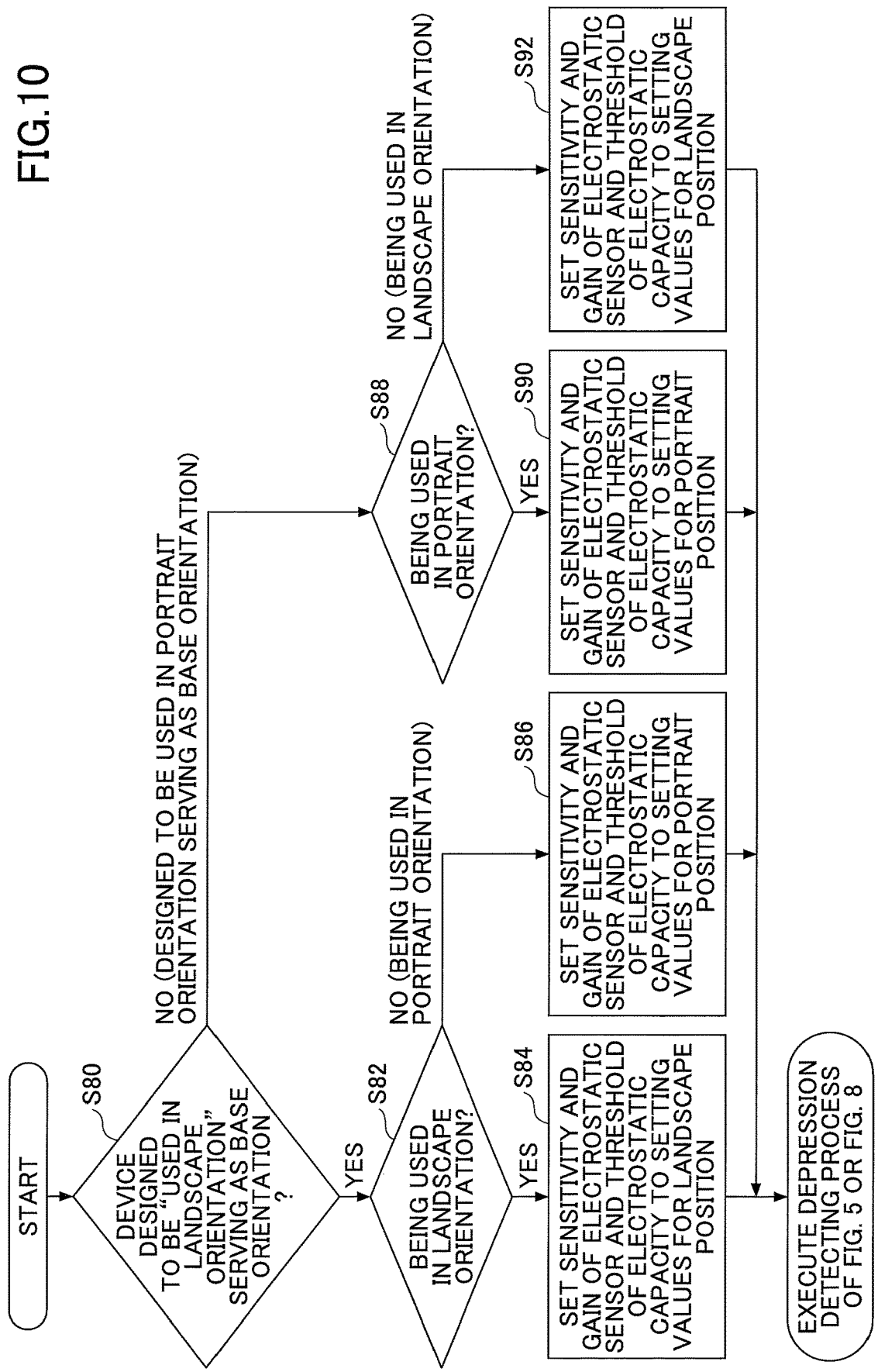

TOUCH SENSOR AND TERMINAL DEVICE

CROSS-REFERENCE TO RELATED APPLICATION

This application is based upon and claims the benefit of priority of the prior Japanese Patent Application No. 2016-083104, filed on Apr. 18, 2016, the entire contents of which are incorporated herein by reference.

FIELD

A certain aspect of the embodiments discussed herein is related to touch sensors and terminal devices.

BACKGROUND

Various techniques to control the validity of a touch operation on a certain region have been proposed. For example, a technique to perform such control as to determine, in response to detection of a first touch operation on a particular region and a second touch operation on a region other than the particular region on a touchscreen, that the first touch operation is invalid and the second touch operation is valid is known. (See, for example, Japanese Laid-open Patent Publication No. 2013-196582.)

Furthermore, for example, a technique to determine, using a first region and a second region greater than the first region, that the first region is depressed in response to determining that a finger is within the second region when leaving the first region after depressing the first region is known. (See, for example, Japanese Laid-open Patent Publication No. 11-175212.)

SUMMARY

According to an aspect of the embodiments, a touch sensor includes a sensor and a processor. The sensor detects touch operations on first, second, and third regions of a sensor region disposed along a longitudinal direction of an outer edge portion of a terminal device. The second and third regions are on opposite sides of the first region. The processor identifies the orientation of the terminal device as a first orientation where the sensor region is located at the top or bottom of the terminal device or a second orientation where the sensor region is located at the right or left of the terminal device, and makes a different determination as to whether the first region is depressed based on whether the identified orientation is the first or second orientation, in response to detection of the touch operation on at least one of the second and third regions together with the touch operation on the first region.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 5 is a flowchart illustrating a depression detecting process according to the first embodiment;

FIGS. 6A through 6E are diagrams for illustrating the depression detecting process according to the first embodiment;

FIG. 10 is a flowchart illustrating a depression detecting process according to a third embodiment.

DESCRIPTION OF EMBODIMENTS

Figure 1A:
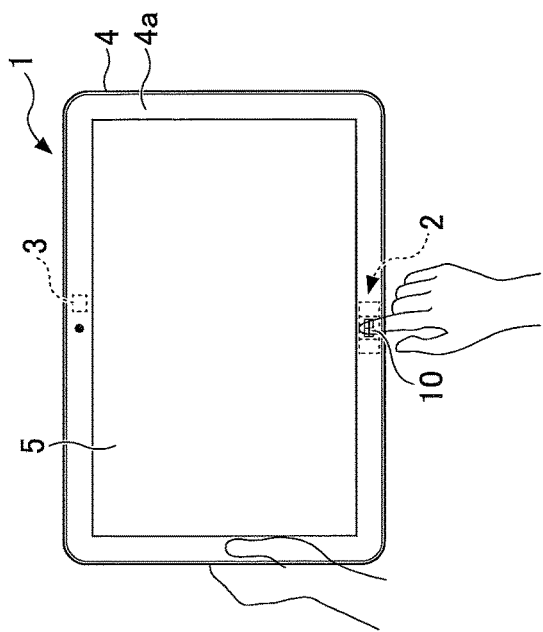
FIGS. 1A through 1D are diagrams illustrating orientations of a terminal device and button operations according to an embodiment.

According to the above-described techniques, however, the relationship between the position of a particular region and a finger that touches the particular region changes depending on how a terminal device used is held. Therefore, for example, a wrong determination may be made as to whether a touch operation on a particular region is an operation intended by a user when no consideration is given to whether the terminal device is held by a user in a portrait orientation or a landscape orientation.

According to an aspect of the embodiments, false recognition of an operation on a particular region is reduced.

Preferred embodiments of the present invention will be explained with reference to accompanying drawings. In the specification and drawings, elements having substantially the same functional configuration are referred to using the same reference numeral, and a repetitive description thereof is omitted.

An overall arrangement and operations of a terminal device are described below. First, the orientation and button operations of a terminal device according to an embodiment are described with reference to FIGS. 1A through 1D and FIGS. 2A through 2D. FIGS. 1A, 1B, 2A and 2B illustrate orientations of a terminal device 1 according to an embodiment. FIGS. 1C, 1D, 2C and 2D illustrate operations of a button 10 according to the orientation of the terminal device 1. The terminal device 1 may be implemented by a tablet terminal, a smartphone, a handheld gaming device, a portable music player, and a portable image processor.

Referring to FIGS. 1A, 1B, 2A and 2B, the terminal device 1 includes a substantially rectangular body 4. The body 4 includes a display 5 and an outer edge portion 4a of a predetermined width edging the periphery of the display 5.

The terminal device 1 further includes an electrostatic sensor 2, the button 10 controlled by the electrostatic sensor 2, and an acceleration sensor 3. The electrostatic sensor 2 is housed in the body 4 at a position immediately below the button 10. When the button 10 is depressed by a user's finger, the electrostatic sensor 2 detects a change in electrostatic capacity due to pressure on the button 10. When the button 10 is depressed with a force at or above a predetermined level so that the depression of the button 10 is detected, the terminal device 1 executes an operation of a function correlated with the button 10. Examples of executed operations include displaying a menu on the display 5 and turning off power.

The terminal device 1 depicted in FIGS. 1A through 1D is designed to be used while being horizontally held in a landscape orientation serving as the base orientation. According to this design, when the terminal device 1 is horizontally held (in a landscape orientation) as depicted in FIG. 1A, the button 10 is located at the bottom center of the outer edge portion 4a of the body 4. The location of the button 10, however, is not limited to this, and the button 10 may be located at either the top center or the bottom center of the outer edge portion 4a of the body 4 of the terminal device 1 in a landscape orientation.

Figure 1C:
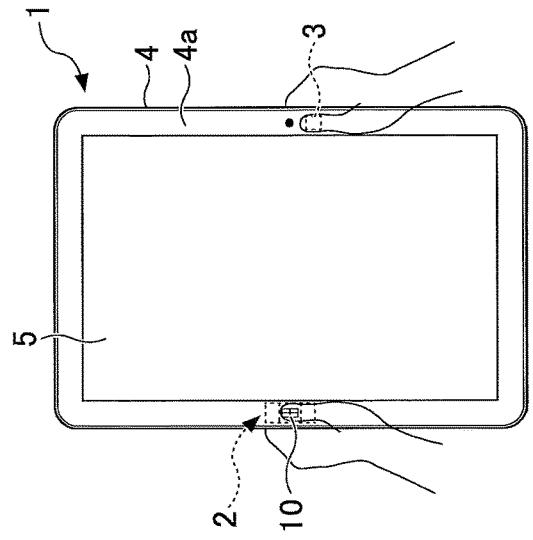
Figure 1B:
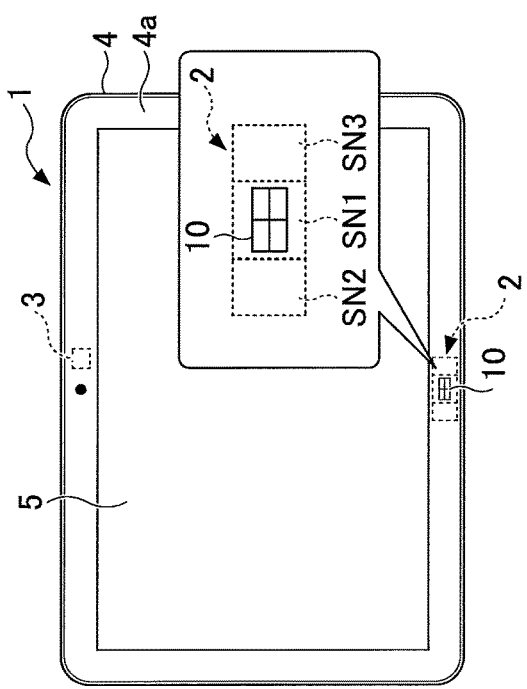

FIG. 1B depicts the terminal device 1 vertically held (in a portrait orientation). When the terminal device 1 is held in this orientation, the button 10 is located at the left side center of the outer edge portion 4a of the body 4. The location of the button 10, however, is not limited to this, and the button 10 may be located at either the right side or the left side of the outer edge portion 4a of the body 4 of the terminal device 1 in a portrait orientation.

The electrostatic sensor 2 is divided into a first region SN1, a second region SN2, and a third region SN3, which form a particular region (sensor region). The second region SN2 and the third region SN3 are disposed outside the first region SN1. The electrostatic sensor 2 detects touch operations on the first through third regions SN1 through SN3. The electrostatic sensor 2 is disposed so that the first through third regions SN1 through SN3 are positioned along a longitudinal direction of the outer edge portion 4a of the body 4. That is, the first through third regions SN1 through SN3 are disposed with the first region SN1 at the center and the second and third regions SN2 and SN3 across the first region SN1 from each other along a longitudinal direction of the outer edge portion 4a. According to this embodiment, it is determined whether the button 10 is depressed, based on the presence or absence of a touch operation on each of the first through third regions SN1 through SN3 of the electrostatic sensor 2. The first region SN1 is designed in view of finger size to be so wide as to accommodate a finger.

Figure 1D:
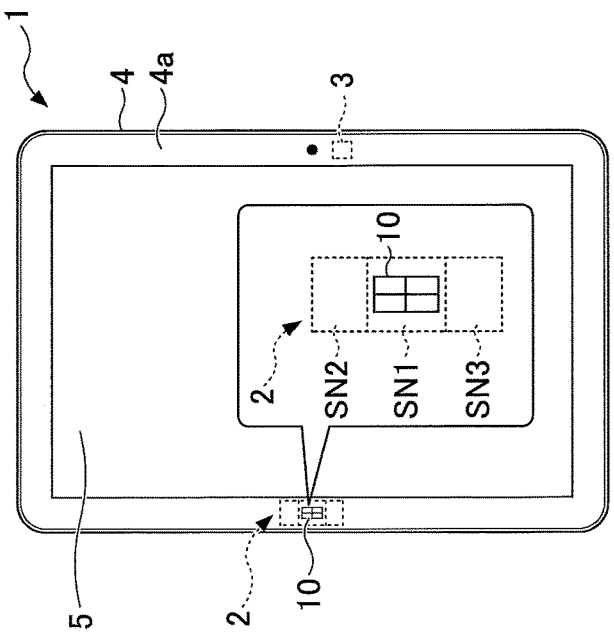

It is assumed that the terminal device 1 whose base orientation is a landscape orientation is held in a landscape orientation. In this case, when a finger depresses the button 10, the finger is perpendicular to a direction in which the first through third regions SN1 through SN3 are arranged as depicted in FIG. 1C. In contrast, when the terminal device 1 is held in a portrait orientation, rotated 90° from the landscape orientation, the finger, when depressing the button 10, is parallel to the direction in which the first through third regions SN1 through SN3 are arranged as depicted in FIG. 1D.

Figure 2A:
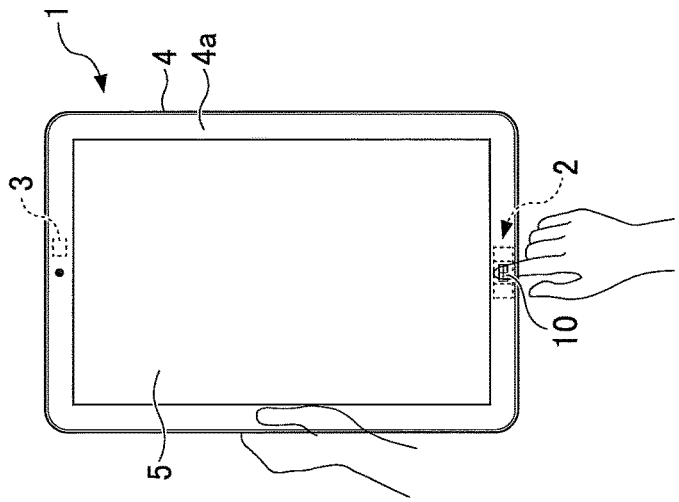
FIGS. 2A through 2D are diagrams illustrating orientations of the terminal device and button operations according to an embodiment.

The terminal device 1 depicted in FIGS. 2A through 2D is designed to be used while being vertically held in a portrait orientation serving as the base orientation. According to this design, when the terminal device 1 is held in a portrait orientation as depicted in FIG. 2A, the button 10 is located at the bottom center of the outer edge portion 4a of the body 4. The location of the button 10, however, is not limited to this, and the button 10 may be located at either the top center or the bottom center of the outer edge portion 4a of the body 4 of the terminal device 1 in a portrait orientation.

Figure 2B:
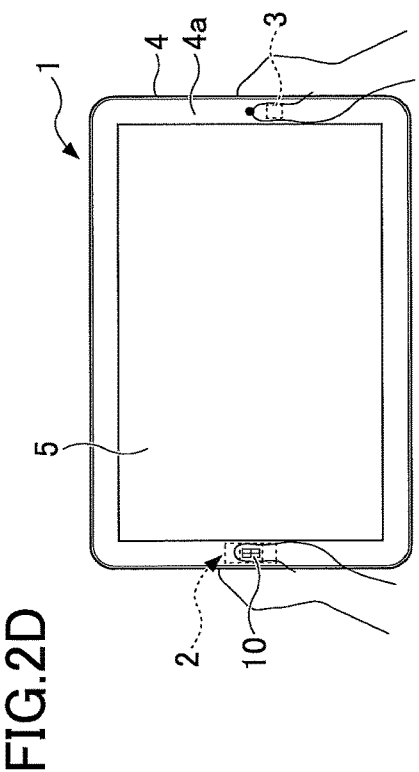

FIG. 2B depicts the terminal device 1 horizontally held (in a landscape orientation). When the terminal device 1 is held in this orientation, the button 10 is located at the left side center of the outer edge portion 4a of the body 4. The location of the button 10, however, is not limited to this, and the button 10 may be located at either the right side or the left side of the outer edge portion 4a of the body 4 of the terminal device 1 in a portrait orientation.

Figure 2C:
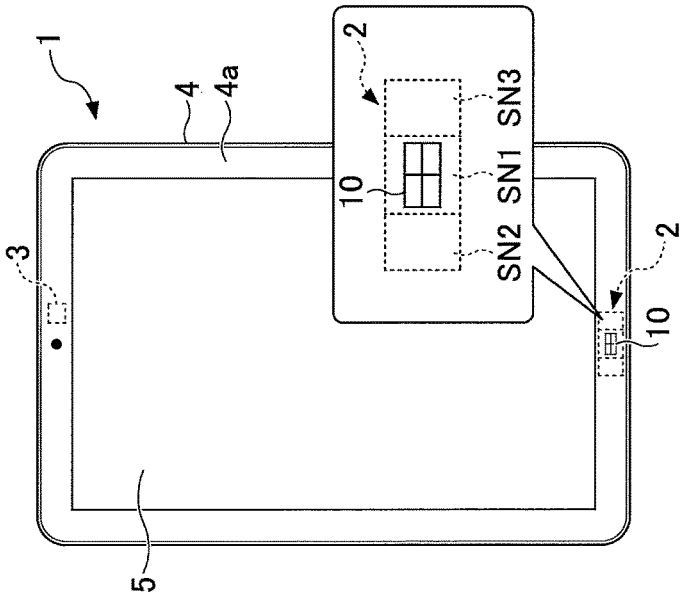
Figure 2D:
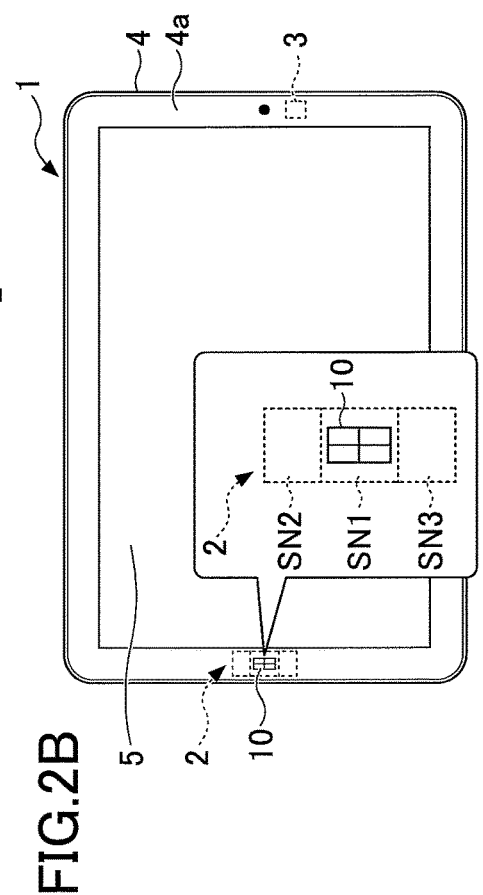

It is assumed that the terminal device 1 whose base orientation is a portrait orientation is held in a portrait orientation. In this case, when a finger depresses the button 10, the finger is perpendicular to the direction in which the first through third regions SN1 through SN3 are arranged as depicted in FIG. 2C. In contrast, when the terminal device 1 is held in a landscape orientation, rotated 90° from the portrait orientation, the finger, when depressing the button 10, is parallel to the direction in which the first through third regions SN1 through SN3 are arranged as depicted in FIG. 2D.

When a finger depresses the button 10, a shape in which the finger contacts a surface is not circular but elliptical, having a major axis in the direction of the length of the finger. That is, a surface wider in the direction of the length of the finger than in the direction of the width of the finger is depressed (see, for example, FIGS. 6A through 6E).

Accordingly, when the button 10 in the vicinity of the center of on one side of the rectangular terminal device 1 is operated, how a finger touches a key portion including the button 10 differs depending on whether the terminal device 1 is held horizontally or vertically. That is, when the terminal device 1 is horizontally held, a finger touches the key portion sideways as depicted in FIGS. 1C and 2C. In contrast, when the terminal device 1 is vertically held, a finger touches the key portion from bottom (or from top) as depicted in FIGS. 1D and 2D.

If a touch operation on the button 10 is uniformly determined using the same determination condition irrespective of how the terminal device 1 is held, a wrong determination may be made as to whether the button 10 is depressed. Therefore, the terminal device 1 of this embodiment determines whether a user holds the terminal device 1 vertically (in a portrait orientation) or horizontally (in a landscape orientation). Then, the terminal device 1, in accordance with the orientation in which the terminal device 1 is held, changes a condition for determining whether the operation on the button 10 is an operation instruction intended by a user or a wrong operation not intended as an operation instruction, that is, changes regions of the first through third regions SN1 through SN3 to be depressed to determine that the operation on the button 10 is an operation instruction intended by a user or a wrong operation not intended as an operation instruction. This makes it possible to reduce wrong determinations regarding touch operations on the button 10.

Hereinafter, the orientation of the terminal device 1 in which the button 10 is located at the bottom or top of the body 4 as depicted in FIGS. 1A and 2A is referred to as "first orientation," and the orientation of the terminal device 1 in which the button 10 is located at the left or right of the body 4 as depicted in FIGS. 1B and 2B is referred to as "second orientation."

The acceleration sensor 3 is used to determine whether the terminal device 1 is in the first orientation or in the second orientation. The acceleration sensor 3 determines the orientation of the terminal device 1 based on sensor values on three axes, namely, X, Y and Z axes.

Figure 3:
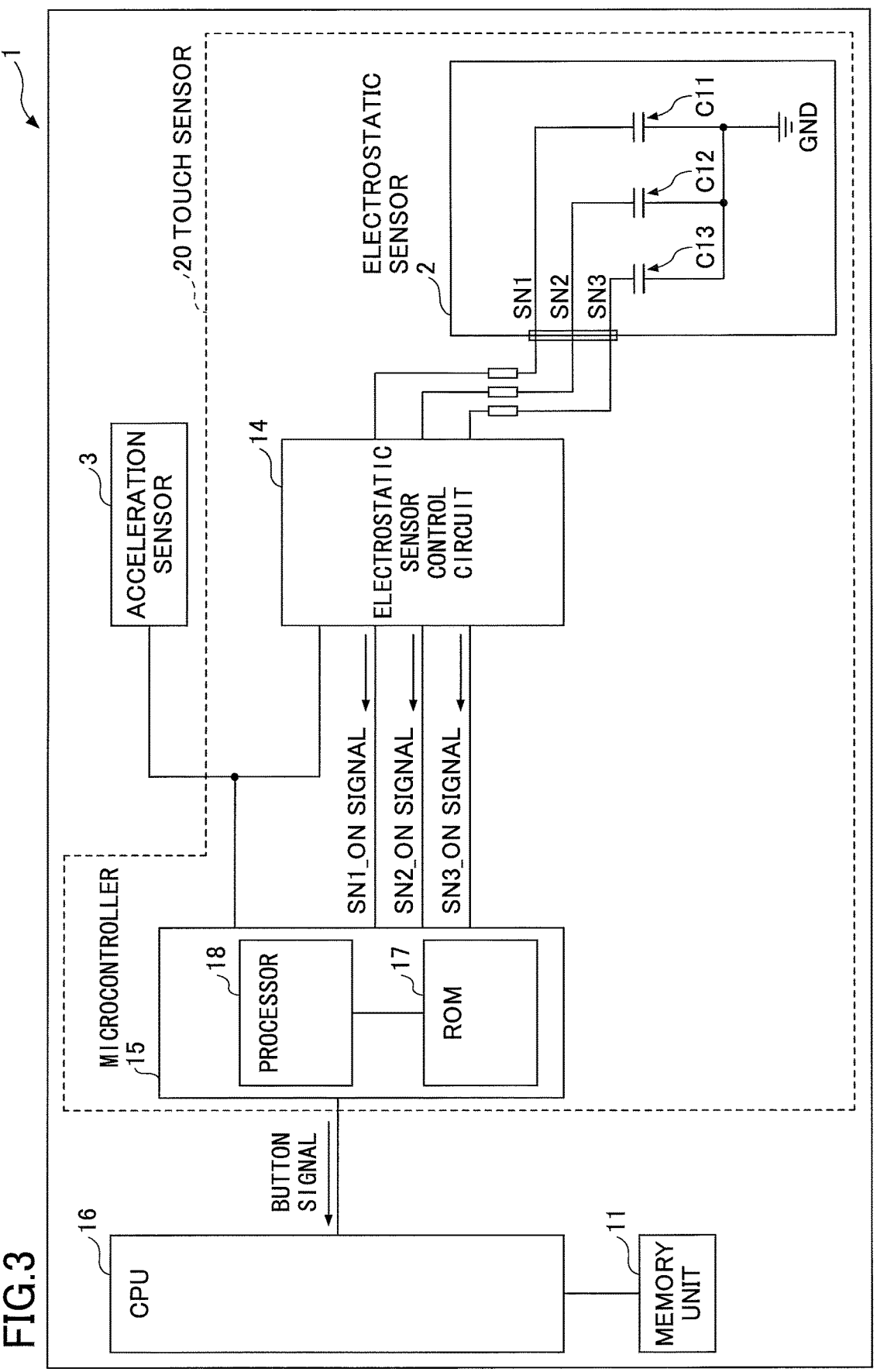
FIG. 3 is a block diagram depicting a hardware arrangement of the terminal device according to an embodiment.

Next, a hardware arrangement of the terminal device 1 is described with reference to FIG. 3. The terminal device 1 includes the electrostatic sensor 2, the acceleration sensor 3, an electrostatic sensor control circuit 14, a microcontroller 15, a central processing unit (CPU) 16, and a memory unit 11 including a read-only memory (ROM) and a random access memory (RAM). The electrostatic sensor 2, the electrostatic sensor control circuit 14, and the microcontroller 15 are an example arrangement included in a touch sensor 20. The touch sensor 20 operates as a sensor to detect a touch operation on each of the first through third regions SN1 through SN3 to determine whether the button 10 is depressed.

The electrostatic sensor 2 detects electrostatic capacity or a change in electrostatic capacity when the first through third regions SN1 through SN3 are depressed by a finger. The electrostatic capacity of the first region SN1 is detected with a capacitor C11. The electrostatic capacity of the second region SN2 is detected with a capacitor C12. The electrostatic capacity of the third region SN3 is detected with a capacitor C13. Values detected in response to touch operations on the first through third regions SN1 through SN3 are transmitted and input to the electrostatic sensor control circuit 14.

The electrostatic sensor control circuit 14 determines, with respect to each of the input detected values, whether the input detected value exceeds a predetermined threshold. The electrostatic sensor control circuit 14 further determines, in response to determining that the input detected value exceeds a predetermined threshold, that one of the first through third regions SN1 through SN3 corresponding to the input detected value is turned on (touched) to transmit "ON information" indicating that the corresponding one of the first through third regions SN1 through SN3 is turned on to the microcontroller 15. For example, in response to determining that the electrostatic capacity of the first region SN1 at the time when a touch operation is performed on the first region SN1 exceeds a threshold set for the first region SN1, the electrostatic sensor control circuit 14 transmits the ON information of the first region SN1, namely, a SN1_ON signal, to the microcontroller 15.

The microcontroller 15 includes a built-in ROM 17 and a processor 18 such as a CPU coupled to the ROM 17, and contains the above-described thresholds used for determining the presence or absence of touch operations in the ROM 17. The microcontroller 15 transmits the preset thresholds to the electrostatic sensor control circuit 14. The microcontroller 15 determines, in response to a user's touch operation, whether the button 10 is depressed based on the SN1_ON signal, an SN2_ON signal, and an SN3_ON signal received from the electrostatic sensor control circuit 14. At this point, the microcontroller 15 changes a condition for determining whether the button 10 is depressed based on whether the terminal device 1 is used in a landscape orientation or in a portrait orientation in view of the design of the terminal device 1. This makes it possible to reduce false recognition with respect to operations of the button 10. The microcontroller 15 transmits a button signal to the CPU 16 in response to determining that the button 10 is depressed.

The CPU 16 executes the operation of a function correlated with the button 10 in response to receiving the button signal. For example, the CPU 16 displays a menu on the display 5 in response to receiving the button signal.

[a] First Embodiment

Next, a functional arrangement of the touch sensor 20 according to a first embodiment is described with reference to FIG. 4. The touch sensor 20 includes a sensor part 21, a storage part 22, an operation determining part 23, an orientation identifying part 24, a depression determining part 25, and an output part 26.

The sensor part 21 detects touch operations on the first through third regions SN1 through SN3 based on sensor values transmitted from the electrostatic sensor 2. Furthermore, the sensor part 21 detects the orientation of the terminal device 1 based on sensor values transmitted from the acceleration sensor 3. The storage part 22 contains a threshold table 30 and a depression detection program 31.

The threshold table 30 separately contains thresholds for the case where the terminal device 1 is in a portrait orientation and thresholds for the case where the terminal device 1 is in a landscape orientation. For example, according to the threshold table 30 of FIG. 4, the threshold of an electrostatic capacity is determined with respect to each of the landscape orientation and the portrait orientation of the terminal device 1. In addition, thresholds regarding the sensitivity and gain of the electrostatic sensor 2 may be set with respect to each of the landscape orientation and the portrait orientation of the terminal device 1 in the threshold table 30.

The operation determining part 23 compares the values of touch operations on the first through third regions SN1 through SN3 detected using the electrostatic sensor 2 by the sensor part 21 with a threshold set in the threshold table 30. When a detected value (among the detected values) exceeds the threshold, the operation determining part 23 determines that one of the first through third regions SN1 through SN3 corresponding to the detected value is touched.

The orientation identifying part 24 identifies (determines), based on the values detected using the acceleration sensor 3 by the sensor part 21, whether the orientation of the terminal device 1 is the first orientation, in which the button 10 is located at the bottom or top of the terminal device 1, or the second orientation, in which the button 10 is located at the right or left of the terminal device 1.

The depression determining part 25 makes a different determination as to whether the button 10 is depressed based on whether the identified orientation of the terminal device 1 is the first orientation or the second orientation, in response to the detection of a touch operation on the second region SN2 or the third region SN3 together with a touch operation on the first region SN1.

The output part 26 outputs a button signal indicating the depression of the button 10 in response to the determination of the depression of the button 10. The button signal is input to the CPU 16.

An operation executing part 27 of the CPU 16 executes the operation of a function correlated to the button 10 in response to the inputting of the button signal. As a result, a user can obtain the operation of the terminal device 1 that the user requests in response to the depression of the button 10. The operation executing part 27 is implemented by the CPU 16 executing a program stored in the memory unit 11.

Functions of the sensor part 21 may be implemented by the electrostatic sensor 2 and the acceleration sensor 3. Functions of the storage part 22 may be implemented by the ROM 17. Functions of the operation determining part 23 may be implemented by the electrostatic sensor control circuit 14. Functions of the orientation identifying part 24, the depression determining part 25, and the output part 26 may be implemented by the microcontroller 15. That is, the orientation identifying part 24, the depression determining part 25, and the output part 26 are implemented by processes that the depression detection program 31 installed in the storage part 22 causes the microcontroller 15 (processor 18) to execute.

Figure 4:
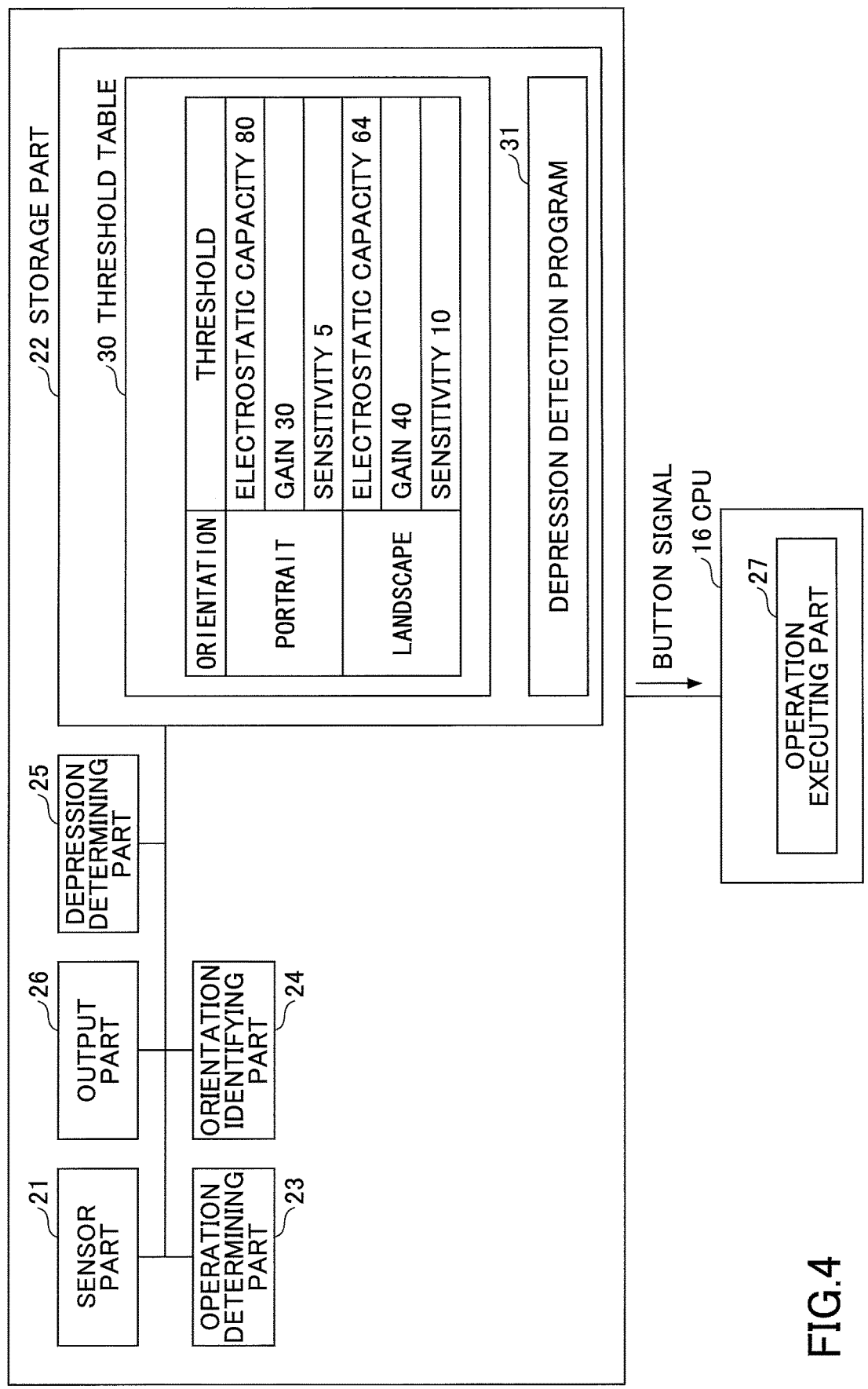
FIG. 4 is a diagram depicting a functional arrangement of the terminal device according to a first embodiment.

FIG. 4 is a functional block diagram, and the parts represented by functional blocks may be implemented by hardware alone, software alone, or a combination of hardware and software.

Next, a depression detecting process according to the first embodiment is described with reference to FIGS. 5 and 6A through 6E. FIG. 5 is a flowchart illustrating a depression detecting process according to the first embodiment. FIGS. 6A through 6E are diagrams for illustrating a depression detecting process according to the first embodiment.

When the process starts, at step S10, the operation determining part 23 determines whether the first region SN1 is depressed based on a value detected using the electrostatic sensor 2 by the sensor part 21. The process of step S10 is repeated until the first region SN1 is depressed. In response to determining that the first region SN1 is depressed, at step S12, the operation determining part 23 determines whether the terminal device 1 is designed to be used in a landscape orientation serving as the base orientation (namely, whether the base orientation of the terminal device 1 in which the terminal device 1 is designed to be used is a landscape orientation). In response to determining by the operation determining part 23 that the terminal device 1 is designed to be used in a landscape orientation serving as the base orientation (YES at step S12), at step S14, the orientation identifying part 24 identifies the orientation of the terminal device 1 based on values detected using the acceleration sensor 3 by the sensor part 21, and determines whether the terminal device 1 is being used in a landscape orientation based on the identified orientation of the terminal device 1.

In response to determining by the orientation identifying part 24 that the terminal device 1 is being used in a landscape orientation (YES at step S14), at step S16, the operation determining part 23 determines whether the second region SN2 or the third region SN3 is depressed or not. In response to determining by the operation determining part 23 that neither the second region SN2 nor the third region SN3 is depressed (NO at step S16), at step S18, the depression determining part 25 determines that the button 10 is depressed, and asserts the button signal to notify the CPU 16 of the depression of the button 10. Then, the depression determining part 25 ends this process.

In response to determining at step S16 by the operation determining part 23 that at least one of the second region SN2 and the third region SN3 is depressed (YES at step S16), at step S20, the depression determining part 25 determines that the determination of the depression of the button 10 is a wrong reaction, and ends this process without asserting the button signal.

In response to determining at step S14 by the orientation identifying part 24 that the terminal device 1 is being used in a portrait orientation (NO at step S14), at step S22, the operation determining part 23 determines whether both of the second region SN2 and the third region SN3 are depressed. In response to determining by the operation determining part 23 that both of the second region SN2 and the third region SN3 are not depressed although the second region SN2 or the third region SN3 is depressed (No at step S22), at step S24, the depression determining part 25 determines that the button 10 is depressed, and asserts the button signal to notify the CPU 16 of the depression of the button 10. Then, the depression determining part 25 ends this process.

In response to determining at step S22 by the operation determining part 23 that both of the second region SN2 and the third region SN3 are depressed (YES at step S22), at step S26, the depression determining part 25 determines that the determination of the depression of the button 10 is a wrong reaction, and ends this process without asserting the button signal.

In response to determining at step S12 by the operation determining part 23 that the terminal device 1 is designed to be used in a portrait orientation serving as the base orientation (NO at step S12), at step S28, the orientation identifying part 24 identifies the orientation of the terminal device 1 based on values detected using the acceleration sensor 3 by the sensor part 21, and determines whether the terminal device 1 is being used in a portrait orientation based on the identified orientation of the terminal device 1.

In response to determining by the orientation identifying part 24 that the terminal device 1 is being used in a portrait orientation (YES at step S28), at step S30, the operation determining part 23 determines whether the second region SN2 or the third region SN3 is depressed or not. In response to determining by the operation determining part 23 that neither the second region SN2 nor the third region SN3 is depressed (NO at step S30), at step S32, the depression determining part 25 determines that the button 10 is depressed, and asserts the button signal to notify the CPU 16 of the depression of the button 10. Then, the depression determining part 25 ends this process.

In response to determining at step S30 by the operation determining part 23 that at least one of the second region SN2 and the third region SN3 is depressed (YES at step S30), at step S34, the depression determining part 25 determines that the determination of the depression of the button 10 is a wrong reaction, and ends this process without asserting the button signal.

In response to determining at step S28 by the orientation identifying part 24 that the terminal device 1 is being used in a landscape orientation (NO at step S28), at step S36, the operation determining part 23 determines whether both of the second region SN2 and the third region SN3 are depressed. In response to determining by the operation determining part 23 that both of the second region SN2 and the third region SN3 are not depressed although the second region SN2 or the third region SN3 is depressed (No at step S36), at step S38, the depression determining part 25 determines that the button 10 is depressed, and asserts the button signal to notify the CPU 16 of the depression of the button 10. Then, the depression determining part 25 ends this process.

In response to determining at step S36 by the operation determining part 23 that both of the second region SN2 and the third region SN3 are depressed (YES at step S36), at step S40, the depression determining part 25 determines that the determination of the depression of the button 10 is a wrong reaction, and ends this process without asserting the button signal.

Button depressions that are the results of detection according to the above-described depression detecting process of the first embodiment are described with reference to FIGS. 6A through 6E. In FIGS. 6A through 6E, a touched region is indicated by a thick solid line while an untouched region is indicated by a dashed line. For example, in the case of the terminal device 1 whose base orientation is a landscape orientation, when the first region SN1 is the sole touched region as depicted in FIG. 6A, the determination of the process of step S16 is "NO," and the process of step S18 is executed. As a result, a button signal indicating the depression of the button 10 is transmitted to the CPU 16.

In contrast, when the first and second regions SN1 and SN2 are touched as depicted in FIG. 6B or when the first and third regions SN1 and SN3 are touched as depicted in FIG. 6C, the determination of the process of the step S16 is "YES." As a result, the determination of the depression of the button 10 is determined as a wrong reaction, and no button signal is transmitted to the CPU 16.

Next, a description is given of, for example, the case of using the terminal device 1 whose base orientation is a landscape orientation in a portrait orientation, rotated 90° from the base orientation, as depicted in FIGS. 6D and 6E. In this case, when all of the first through third regions SN1 through SN3 are touched as depicted in FIG. 6D, the determination of the process of step S22 is "YES," and the determination of the depression of the button 10 is determined as a wrong reaction, so that no button signal is transmitted to the CPU 16.

In contrast, when the first region SN1 and the third region SN3 are touched as depicted in FIG. 6E, the determination of the process of step S22 is "NO," and a button signal indicating the depression of the button 10 is transmitted to the CPU 16.

When the terminal device 1 whose base orientation is a landscape orientation is used in a landscape orientation, the second region SN2 and the third region SN3, which are cancel areas, are structurally less likely to be touched by a user's finger. Therefore, the terminal device 1 is more likely to be operated as intended by the user. In contrast, when the terminal device 1 whose base orientation is a landscape orientation is used in a portrait orientation, the second region SN2 and the third region SN3, which are cancel areas, are structurally more likely to be touched by a user's finger. Therefore, according to conventional terminal devices, the operation of the button 10 is more often subject to cancel than as intended by a user, thus making it difficult to operate a terminal device as the user intends.

According to the depression detecting process of this embodiment, when the terminal device 1 whose base orientation is a landscape orientation is used in a portrait orientation, the depression of the button 10 is canceled only when both of the areas of the second region SN2 and the third region SN3 (cancel areas) are depressed (along with the area of the first region SN1) with a finger as depicted in FIG. 6D. When only one of the areas of the second region SN2 and the third region SN3 is depressed (along with the area of the first region SN1) with a finger as depicted in FIG. 6E, the depression of the button 10 is not canceled. As a result, when the terminal device 1 is used in either orientation, the button 10 may be operated as intended by a user.

Thus, according to this embodiment, the number of cases where an operation unintended by a user is performed or an operation intended by a user is not performed because of falsely recognizing an unintended operation on the button 10 as a depressing operation or falsely recognizing an intended operation on the button 10 as a wrong operation and not a depressing operation is reduced.

According to the depression detecting process of this embodiment, however, when the second region SN2 and the third region SN3 are vertically arranged relative to the position of the first region SN1 of the button 10, the depression of the button 10 is determined in response to one of the second region SN2 and the third region SN3 being touched. Therefore, the depression of the button 10 may be incorrectly detected. Accordingly, a second embodiment capable of further reducing false recognitions is described below.

[b] Second Embodiment

Figure 7:
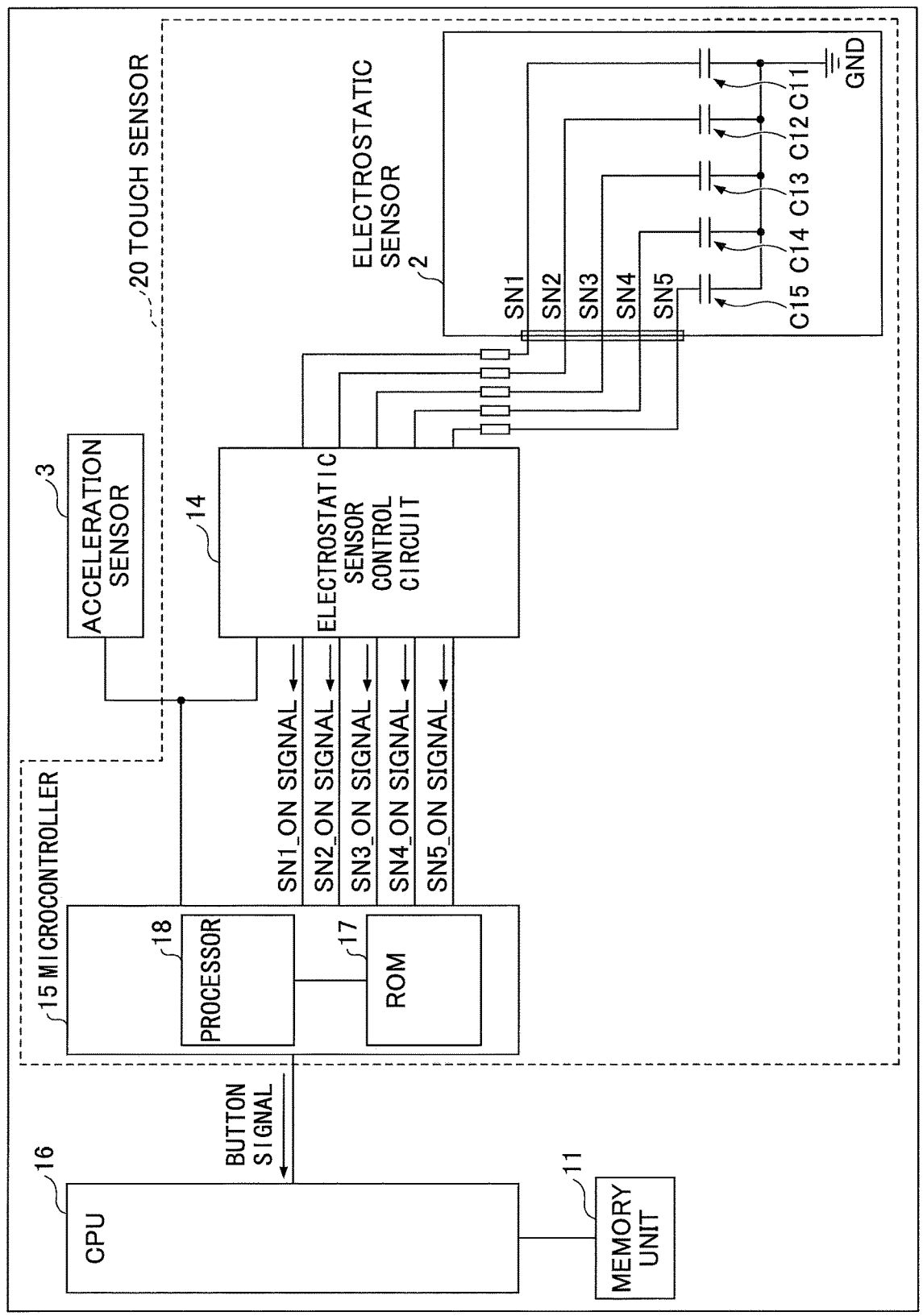
FIG. 7 is a diagram depicting a functional arrangement of the terminal device according to a second embodiment.

Next, a functional arrangement of the touch sensor 20 according to the second embodiment is described with reference to FIG. 7. The configurations of the blocks of the touch sensor 20 according to the second embodiment are the same as the configurations of the blocks of the touch sensor 20 according to the first embodiment. The second embodiment, however, is different from the first embodiment in that the electrostatic sensor 2 is divided into five regions, namely, the first region SN1, the second region SN2, the third region SN3, a fourth region SN4, and a fifth region SN5, while the electrostatic sensor 2 is divided into three regions according to the first embodiment. According to the second embodiment, changes in the electrostatic capacities of the first region SN1, the second region SN2, the third region SN3, the fourth region SN4, and the fifth region SN5 are detected with the capacitor C11, the capacitor C12, the capacitor C13, a capacitor C14, and a capacitor C15, respectively.

The sensor part 21 detects touch operations on the first through fifth regions SN1 through SN5. The operation determining part 23 the detected values of touch operations on the first through fifth regions SN1 through SN5 with a threshold set in the threshold table 30. When a detected value (among the detected values) exceeds the threshold, the operation determining part 23 determines that one of the first through fifth regions SN1 through SN5 corresponding to the detected value is touched.

The depression determining part 25 makes a different determination as to whether the button 10 is depressed based on whether the identified orientation of the terminal device 1 is the first orientation or the second orientation, in response to the detection of a touch operation on one of the second through fifth regions SN2 through SN5 together with a touch operation on the first region SN1.

The functions of other parts are the same as in the first embodiment. Accordingly, a description of the functions of other parts is omitted. For example, in response to determining that the electrostatic capacity of the first region SN1 at the time when a touch operation is performed on the first region SN1 exceeds a threshold set for the first region SN1, the electrostatic sensor control circuit 14 transmits the ON information of the first region SN1, namely, a SN1_ON signal, to the microcontroller 15. Likewise, the electrostatic sensor control circuit 14 transmits the SN2_ON signal, the SN3_ON signal, an SN4_ON signal, and an SN5_ON signal corresponding to the second region SN2, the third region SN3, the fourth region SN4, and the fifth region SN5, respectively, to the microcontroller 15.

Figure 8:
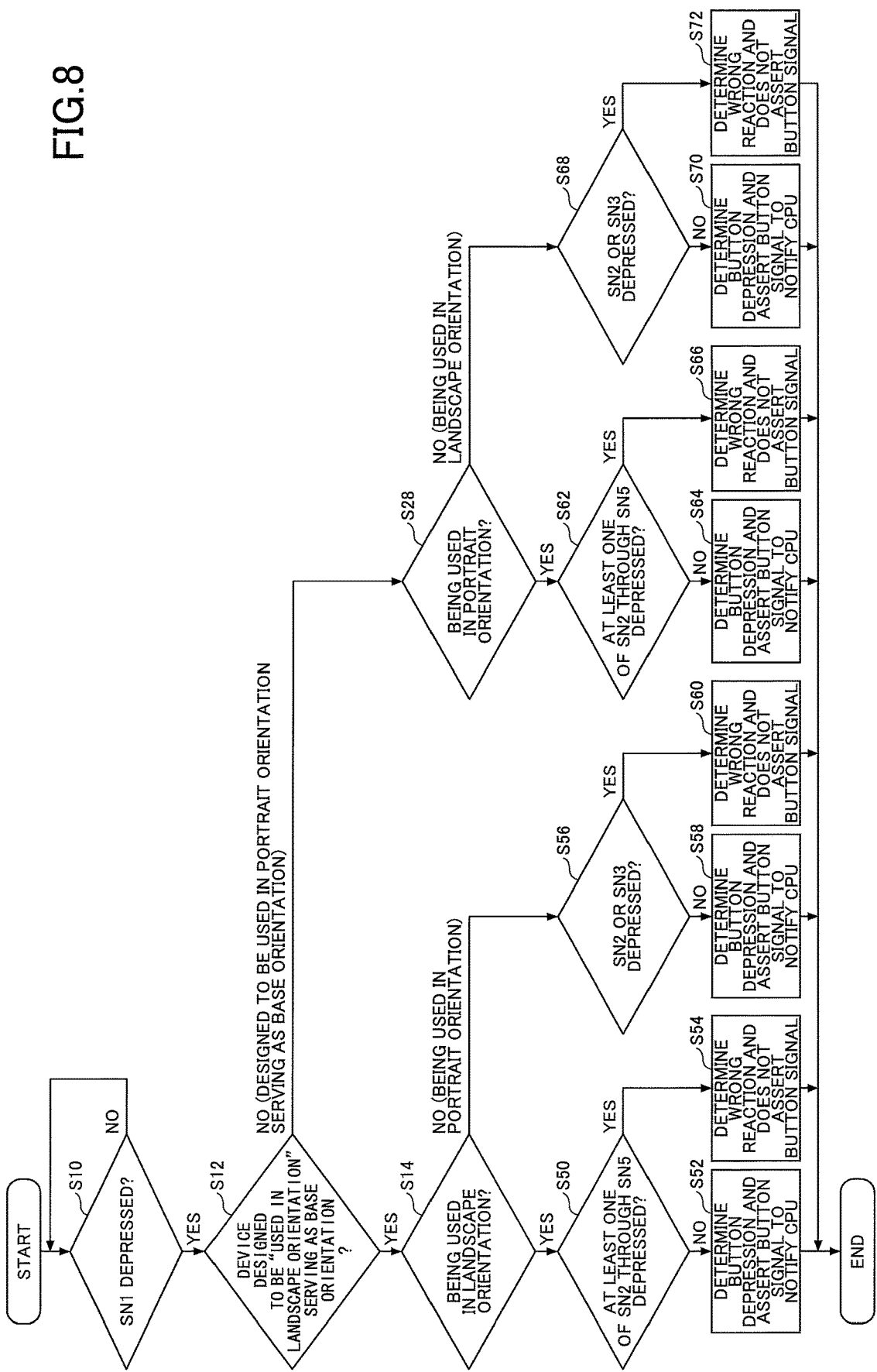
FIG. 8 is a flowchart illustrating a depression detecting process according to the second embodiment.
Figure 9A:
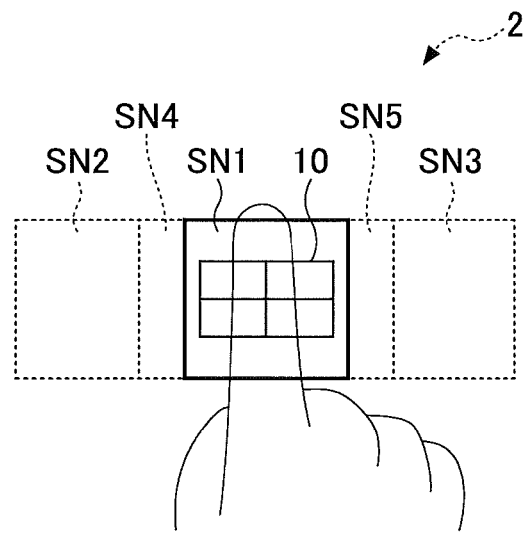
FIGS. 9A through 9C are diagrams for illustrating the depression detecting process according to the second embodiment.
Figure 9B:
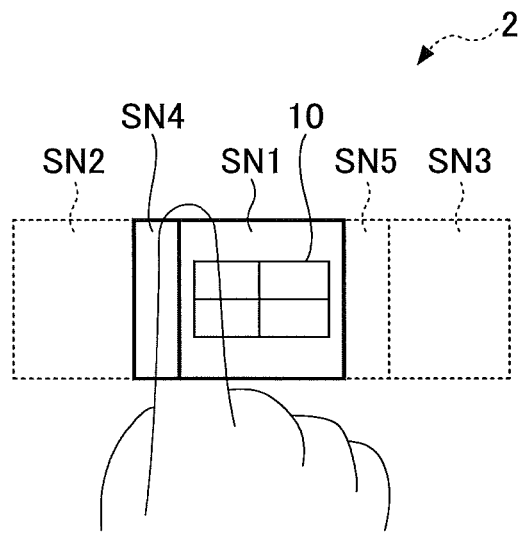
Figure 9C:
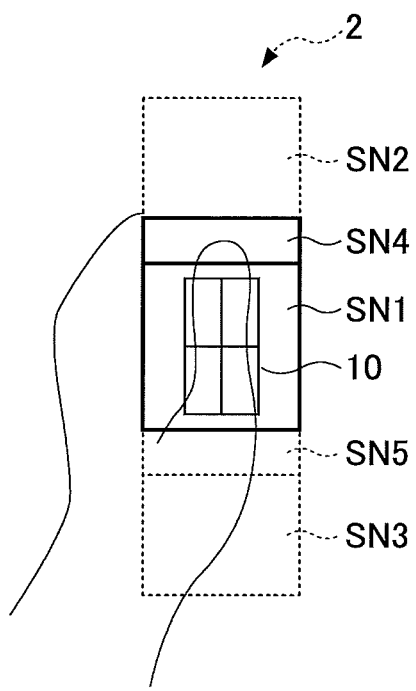

Next, a depression detecting process according to the second embodiment is described with reference to FIGS. 8 and 9A through 9C. FIG. 8 is a flowchart illustrating a depression detecting process according to the second embodiment. FIGS. 9A through 9C are diagrams for illustrating a depression detecting process according to the second embodiment. In FIGS. 9A through 9C, a touched region is indicated by a thick solid line while an untouched region is indicated by a dashed line. In the following description, the same processes as those of the depression detecting process of the first embodiment (FIG. 5) are referred to using the same step numbers. Furthermore, according to this embodiment, as depicted in FIGS. 9A through 9C, in a particular region of the electrostatic sensor 2 disposed for the button 10, the second region SN2, the fourth region SN4, the first region SN1, the fifth region SN5, and the third region SN3 are arranged downward in this order along a longitudinal direction of the outer edge portion 4a.

When the process starts, at step S10, the operation determining part 23 determines whether the first region SN1 is depressed based on a value detected using the electrostatic sensor 2 by the sensor part 21. In response to determining that the first region SN1 is depressed, at step S12, the operation determining part 23 determines whether the terminal device 1 is designed to be used in a landscape orientation serving as the base orientation. In response to determining by the operation determining part 23 that the terminal device 1 is designed to be used in a landscape orientation serving as the base orientation (YES at step S12), at step S14, the orientation identifying part 24 identifies the orientation of the terminal device 1 based on values detected using the acceleration sensor 3 by the sensor part 21, and determines whether the terminal device 1 is being used in a landscape orientation based on the identified orientation of the terminal device 1.

In response to determining by the orientation identifying part 24 that the terminal device 1 is being used in a landscape orientation (YES at step S14), at step S50, the operation determining part 23 determines whether at least one of the second through fifth regions SN2 through SN5 is depressed. In response to determining by the operation determining part 23 that none of the second through fifth regions SN2 through SN5 is depressed (NO at step S50), at step S52, the depression determining part 25 determines that the button 10 is depressed, and asserts the button signal to notify the CPU 16 of the depression of the button 10. Then, the depression determining part 25 ends this process.

In response to determining by the operation determining part 23 that at least one of the second through fifth regions SN2 through SN5 is depressed (YES at step S50), at step S54, the depression determining part 25 determines that the determination of the depression of the button 10 is a wrong reaction, and ends this process without asserting the button signal.

In response to determining at step S14 by the orientation identifying part 24 that the terminal device 1 is being used in a portrait orientation (NO at step S14), at step S56, the operation determining part 23 determines whether the second region SN2 or the third region SN3 is depressed. In response to determining by the operation determining part 23 that neither the second region SN2 nor the third region SN3 is depressed (No at step S56), at step S58, the depression determining part 25 determines that the button 10 is depressed, and asserts the button signal to notify the CPU 16 of the depression of the button 10. Then, the depression determining part 25 ends this process.

In contrast, in response to determining by the operation determining part 23 that either the second region SN2 or the third region SN3 is depressed (YES at step S56), at step S60, the depression determining part 25 determines that the determination of the depression of the button 10 is a wrong reaction, and ends this process without asserting the button signal.

In response to determining at step S12 by the operation determining part 23 that the terminal device 1 is designed to be used in a portrait orientation serving as the base orientation (NO at step S12), at step S28, the orientation identifying part 24 identifies the orientation of the terminal device 1 based on values detected using the acceleration sensor 3 by the sensor part 21, and determines whether the terminal device 1 is being used in a portrait orientation based on the identified orientation of the terminal device 1.

In response to determining by the orientation identifying part 24 that the terminal device 1 is being used in a portrait orientation (YES at step S28), at step S62, the operation determining part 23 determines whether at least one of the second through fifth regions SN2 through SN5 is depressed. In response to determining by the operation determining part 23 that none of the second through fifth regions SN2 through SN5 is depressed (NO at step S62), at step S64, the depression determining part 25 determines that the button 10 is depressed, and asserts the button signal to notify the CPU 16 of the depression of the button 10. Then, the depression determining part 25 ends this process.

In contrast, in response to determining by the operation determining part 23 that at least one of the second through fifth regions SN2 through SN5 is depressed (YES at step S62), at step S66, the depression determining part 25 determines that the determination of the depression of the button 10 is a wrong reaction, and ends this process without asserting the button signal.

In response to determining at step S28 by the orientation identifying part 24 that the terminal device 1 is being used in a landscape orientation (NO at step S28), at step S68, the operation determining part 23 determines whether the second region SN2 or the third region SN3 is depressed. In response to determining by the operation determining part 23 that neither the second region SN2 nor the third region SN3 is depressed (No at step S68), at step S70, the depression determining part 25 determines that the button 10 is depressed, and asserts the button signal to notify the CPU 16 of the depression of the button 10. Then, the depression determining part 25 ends this process.

In contrast, in response to determining by the operation determining part 23 that either the second region SN2 or the third region SN3 is depressed (YES at step S68), at step S72, the depression determining part 25 determines that the determination of the depression of the button 10 is a wrong reaction, and ends this process without asserting the button signal.

As described above, according to the depression detecting process of the second embodiment, in the terminal device 1 whose base orientation is a landscape orientation, the depression of the button 10 is determined when the first region SN1 is the sole touched region as depicted in FIG. 9A the same as in the first embodiment.

In contrast, when the first region SN1 and the fourth region SN4 are touched as depicted in FIG. 9B, a touch operation on the first region SN1 is determined as a wrong operation. Likewise, when the first region SN1 and the fifth region SN5 are touched, a touch operation on the first region SN1 is determined as a wrong operation.

Next, a description is given of the case of using the terminal device 1 whose base orientation is a landscape orientation in a portrait orientation as depicted in FIG. 9C. In this case, when the second region SN2 or the third region SN3 is touched together with the first region SN1, a touch operation on the first region SN1 is determined as a wrong operation, and the depression of the button 10 is canceled. On the other hand, even when at least one of the fourth region SN4 and the fifth region SN5 is touched together with the first region SN1, a touch operation on the first region SN1 is determined to be valid, and the depression of the button 10 is determined.

Thus, according to the depression detecting process of this embodiment, whether to cause the fourth region SN4 and the fifth region SN5 to operate as cancel areas is controlled in accordance with the orientation of the terminal device 1. As a result, whether the terminal device 1 is used in a portrait orientation or a landscape orientation, it is possible to reduce the number of cases where an operation on the button 10 unintended by a user is determined as a depressing operation or a depressing operation on the button 10 intended by a user is determined to be canceled, so that it is possible to further reduce wrong determinations as to the depression of the button 10 with respect to operations on the button 10.

According to the first embodiment, the electrostatic sensor 2 is provided with three regions, and it is determined whether the button 10 is depressed based on a combination of operations on the three regions and the orientation of the terminal device 1. In contrast, according to the second embodiment, the electrostatic sensor 2 is provided with five regions, and it is determined whether the button 10 is depressed based on a combination of operations on the five regions and the orientation of the terminal device 1. As a result, whether the button 10 is depressed can be correctly determined in line with the intention of a user, in accordance with whether the terminal device 1 is used in a landscape position or in a portrait position.

Furthermore, the placement condition of regions into which the electrostatic sensor 2 is divided may be changed in accordance with the location of the button 10, such as whether the terminal device 1 is located at a horizontal center or a vertical center. In this case as well, with respect to which of the peripheral regions of a region of the electrostatic sensor 2 corresponding to the position of the button 10 is determined as a cancel area and which of the peripheral regions is determined as a non-cancel area, a condition may be differently determined in accordance with the orientation of the terminal device 1. By controlling a determination as to whether the button 10 is depressed in accordance with the determined condition, it is possible to reduce the number of cases where a depressing operation on the button 10 is falsely recognized as a wrong operation to prevent an operation intended by a user from being performed. Furthermore, it is possible to reduce the number of cases where an operation unintended by a user is determined as a depressing operation to cause an unnecessary operation to be performed.

[c] Third Embodiment

Finger size and shape vary from person to person. This may make it difficult to uniformly determine, with respect to the terminal device 1, the sensitivity and threshold of the electrostatic sensor 2 with respect to touch operations on the first through third regions SN1 through SN3 that are configured to be depressed Therefore, according to a third embodiment, when the terminal device 1 whose base orientation is a landscape orientation is used in a portrait orientation, a combination of the thresholds of the electrostatic capacity, gain, and sensitivity of the electrostatic sensor 2 for the case of a landscape orientation set in the threshold table 30 is changed to a combination of the thresholds of the electrostatic capacity, gain, and sensitivity of the electrostatic sensor 2 for the case of a portrait orientation to execute a depression detection process for touch operations.

A depression detecting process according to the third embodiment is specifically described with reference to FIG. 10. FIG. 10 is a flowchart depicting a depression detecting process according to the third embodiment. When this process starts, at step S80, the operation determining part 23 determines whether the terminal device 1 is designed to be used in a landscape orientation serving as the base orientation. In response to determining by the operation determining part 23 that the terminal device 1 is designed to be used in a landscape orientation serving as the base orientation (YES at step S80), at step S82, the orientation identifying part 24 identifies the orientation of the terminal device 1, and determines whether the terminal device 1 is being used in a landscape orientation based on the identified orientation of the terminal device 1.

In response to determining at step S82 by the orientation identifying part 24 that the terminal device 1 is being used in a landscape orientation (YES at step S82), at step S84, the operation determining part 23 sets the thresholds of the electrostatic capacity, gain, and sensitivity of the electrostatic sensor 2 to setting values for a landscape orientation based on the threshold table 30. Thereafter, the depression detecting process of the first embodiment (FIG. 5) or the second embodiment (FIG. 8) is executed.

In response to determining at step S82 by the orientation identifying part 24 that the terminal device 1 is being used in a portrait orientation (NO at step S82), at step S86, the operation determining part 23 sets the thresholds of the electrostatic capacity, gain, and sensitivity of the electrostatic sensor 2 to setting values for a portrait orientation based on the threshold table 30. Thereafter, the depression detecting process of the first embodiment (FIG. 5) or the second embodiment (FIG. 8) is executed.

In response to determining at step S80 by the operation determining part 23 that the terminal device 1 is designed to be used in a portrait orientation serving as the base orientation (NO at step S80), at step S88, the orientation identifying part 24 identifies the orientation of the terminal device 1, and determines whether the terminal device 1 is being used in a portrait orientation based on the identified orientation of the terminal device 1.

In response to determining at step S88 by the orientation identifying part 24 that the terminal device 1 is being used in a portrait orientation (YES at step S88), at step S90, the operation determining part 23 sets the thresholds of the electrostatic capacity, gain, and sensitivity of the electrostatic sensor 2 to setting values for a portrait orientation based on the threshold table 30. Thereafter, the depression detecting process of the first embodiment (FIG. 5) or the second embodiment (FIG. 8) is executed.

In response to determining at step S88 by the orientation identifying part 24 that the terminal device 1 is being used in a landscape orientation (NO at step S88), at step S92, the operation determining part 23 sets the thresholds of the electrostatic capacity, gain, and sensitivity of the electrostatic sensor 2 to setting values for a landscape orientation based on the threshold table 30. Thereafter, the depression detecting process of the first embodiment (FIG. 5) or the second embodiment (FIG. 8) is executed.

Thus, according to the depression detecting process of the third embodiment, the thresholds of the electrostatic capacity due to a touch operation, sensitivity, and gain of the electrostatic sensor 2 may be changed in accordance with the orientation of the terminal device 1 in use. This makes it possible to flexibly set the thresholds of an electrostatic capacity, sensitivity, and gain, which are difficult to adjust, in accordance with the usage of the terminal device 1. As a result, it is possible to reduce wrong detections of touch operations on the regions of the electrostatic sensor 2. Consequently, it is possible to further increase accuracy in determining whether the button 10 is depressed according to the subsequently executed depression detecting process.

Thus, according to the first through third embodiments, with respect to the button 10 disposed at an easily touchable location and configured to have its depression determined by a change in electrostatic capacity due to pressing, it is possible to determine that the button 10 is depressed when a user intentionally depresses the button 10, and it is possible to reduce the number of cases where the button 10 is determined as being depressed in spite of the absence of a user's intention to depress the button 10. Furthermore, even when the orientation in which the terminal device 1 is held is changed, the condition of determination is changed in accordance with the orientation in which the terminal device 1 is held, so as to enable a button operation as intended by a user. As a result, it is possible to improve the usability of the button 10 disposed at a surface of the terminal device 1.

According to an aspect of the present invention, a non-transitory computer-readable recording medium having stored therein a program for causing a computer to execute a depression detecting process is provided where the depression detecting process includes identifying an orientation of a terminal device as a first orientation in which a sensor region is located at a top or a bottom of the terminal device or a second orientation in which the sensor region is located at a right or a left of the terminal device, the sensor region being divided into a first region, a second region, a third region, a fourth region, and a fifth region that are disposed along a longitudinal direction of an outer edge portion of the terminal device, the second region and the third region being positioned on opposite sides of the first region, the fourth region being positioned between the first region and the second region, the fifth region being positioned between the first region and the third region, wherein touch operations on the first region, the second region, the third region, the fourth region, and the fifth region are detected by a sensor; and making a different determination as to whether the first region is depressed based on whether the identified orientation of the terminal device is the first orientation or the second orientation, in response to detection of the touch operation on the fourth region or the fifth region together with the touch operation on the first region.

Furthermore, in the non-transitory computer-readable recording medium as described above, in response to the detection of the touch operation on the fourth region or the fifth region together with the touch operation on the first region, making the different determination may determine that the first region is depressed when the identified orientation of the terminal device is the second orientation, and determine that the first region is not depressed when the identified orientation of the terminal device is the first orientation.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention. For example, two or more of the above-described embodiments may be combined to the extent that there is no inconsistency between the embodiments.

What is claimed is:

1. A touch sensor, comprising:
    a sensor region divided into a first region, a second region, and a third region that are disposed along an outer edge portion of a terminal device, the second region and the third region being positioned on opposite sides of the first region;
    a sensor configured to detect touch operations on the first region, the second region, and the third region;
    a memory; and
    a processor coupled to the memory, and when the sensor region is depressed with one finger, the processor being configured to:
        identify whether an orientation of the terminal device is a first orientation in which the sensor region is located at a top or a bottom of the terminal device or a second orientation in which the sensor region is located at a right or a left of the terminal device so as to provide an identified orientation;
        make a first determination that the first region is depressed, in response to detection of the touch operation on the first region;
        make a second determination as to whether to cancel the first determination according to a state in which the first region is depressed based on whether the identified orientation of the terminal device is the first orientation or the second orientation, in response to detection of the touch operation on at least one of the second region and the third region together with the touch operation on the first region; and
        transmit a signal indicating a state in which the first region is depressed, when the first determination has been made and the second determination not to cancel the first determination has been made,
    wherein, in response to the detection of the touch operation on the at least one of the second region and the third region together with the touch operation on the first region, the processor is configured to determine not to cancel the first determination according to a state in which the first region is depressed when the identified orientation of the terminal device is the second orientation, and to determine to cancel the first determination according to a state in which the first region is depressed when the identified orientation of the terminal device is the first orientation.

2. The touch sensor as claimed in claim 1, wherein, in response to detection of the touch operation on the second region and the touch operation on the third region together with the touch operation on the first region, the processor is configured to determine to cancel the first determination according to a state in which the first region is depressed when the identified orientation of the terminal device is the second orientation.

3. A terminal device, comprising:
    the touch sensor as set forth in claim 1;
    another memory; and
    another processor coupled to said another memory, and configured to perform an operation for executing a function correlated to the first region in response to determining, by the processor of the touch sensor, that the first region is depressed.

4. The terminal device as claimed in claim 3, wherein, in response to the detection of the touch operation on the at least one of the second region and the third region together with the touch operation on the first region, the processor of the touch sensor is configured to determine not to cancel the first determination according to a state in which the first region is depressed when the identified orientation of the terminal device is the second orientation, and to determine to cancel the first determination according to a state in which the first region is depressed when the identified orientation of the terminal device is the first orientation.

5. The terminal device as claimed in claim 4,
wherein, in response to detection of the touch operation on the second region and the touch operation on the third region together with the touch operation on the first region, the processor of the touch sensor is configured to determine to cancel the first determination according to a state in which the first region is depressed when the identified orientation of the terminal device is the second orientation.

6. A touch sensor, comprising:
a sensor region divided into a first region, a second region, a third region, a fourth region, and a fifth region that are disposed along an outer edge portion of a terminal device, the second region and the third region being positioned on opposite sides of the first region, the fourth region being positioned between the first region and the second region, the fifth region being positioned between the first region and the third region;
a sensor configured to detect touch operations on the first region, the second region, the third region, the fourth region, and the fifth region;
a memory; and
a processor coupled to the memory, and when the sensor region is depressed with one finger, the processor being configured to:
identify whether an orientation of the terminal device is a first orientation in which the sensor region is located at a top or a bottom of the terminal device or a second orientation in which the sensor region is located at a right or a left of the terminal device so as to provide an identified orientation;
make a first determination that the first region is depressed, in response to detection of the touch operation on the first region;
make a second determination as to whether to cancel the first determination according to a state in which the first region is depressed based on whether the identified orientation of the terminal device is the first orientation or the second orientation, in response to detection of the touch operation on the fourth region or the fifth region together with the touch operation on the first region; and
transmit a signal indicating a state in which the first region is depressed, when the first determination has been made and the second determination not to cancel the first determination has been made,
wherein, in response to the detection of the touch operation on the fourth region or the fifth region together with the touch operation on the first region, the processor is configured to determine not to cancel the first determination according to a state in which the first region is depressed when the identified orientation of the terminal device is the second orientation, and to determine to cancel the first determination according to a state in which the first region is depressed when the identified orientation of the terminal device is the first orientation.

7. A terminal device, comprising:
the touch sensor as set forth in claim 6;
another memory; and
another processor coupled to said another memory, and configured to perform an operation for executing a function correlated to the first region in response to determining, by the processor of the touch sensor, that the first region is depressed.

8. The terminal device as claimed in claim 7,
wherein, in response to the detection of the touch operation on the fourth region or the fifth region together with the touch operation on the first region, the processor of the touch sensor is configured to determine not to cancel the first determination according to a state in which the first region is depressed when the identified orientation of the terminal device is the second orientation, and to determine to cancel the first determination according to a state in which the first region is depressed when the identified orientation of the terminal device is the first orientation.

9. A non-transitory computer-readable recording medium having stored therein a program for causing a computer to execute a depression detecting process, the depression detecting process comprising:
identifying whether an orientation of a terminal device is a first orientation in which a sensor region is located at a top or a bottom of the terminal device or a second orientation in which the sensor region is located at a right or a left of the terminal device so as to provide an identified orientation, the sensor region being divided into a first region, a second region, and a third region that are disposed along an outer edge portion of the terminal device, the second region and the third region being positioned on opposite sides of the first region, wherein touch operations on the first region, the second region, and the third region are detected by a sensor;
when the sensor region is depressed by one finger, making a first determination that the first region is depressed, in response to detection of the touch operation on the first region, and making a second determination as to whether to cancel the first determination according to a state in which the first region is depressed based on whether the identified orientation of the terminal device is the first orientation or the second orientation, in response to detection of the touch operation on at least one of the second region and the third region together with the touch operation on the first region; and
transmitting a signal indicating a state in which the first region is depressed, when the first determination has been made and the second determination not to cancel the first determination has been made,
wherein, in response to the detection of the touch operation on the at least one of the second region and the third region together with the touch operation on the first region, said making the second determination determines not to cancel the first determination according to a state in which the first region is depressed when the identified orientation of the terminal device is the second orientation, and determines to cancel the first determination according to a state in which the first region is depressed when the identified orientation of the terminal device is the first orientation.

10. The non-transitory computer-readable recording medium as claimed in claim 9,
wherein, in response to detection of the touch operation on the second region and the touch operation on the third region together with the touch operation on the first region, said making the second determination determines to cancel the first determination according to a state in which the first region is depressed when the identified orientation of the terminal device is the second orientation.

* * * * *